(12) United States Patent
Tochigi et al.

(10) Patent No.: US 11,511,766 B2
(45) Date of Patent: Nov. 29, 2022

(54) DRIVING ASSISTANCE APPARATUS

(71) Applicant: TOYOTA JIDOSHA KABUSHIKI KAISHA, Toyota (JP)

(72) Inventors: Kohei Tochigi, Susono (JP); Shogo Ito, Shizuoka-ken (JP); Yuta Ikezawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 444 days.

(21) Appl. No.: 16/743,570

(22) Filed: Jan. 15, 2020

(65) Prior Publication Data

US 2020/0231172 A1  Jul. 23, 2020

(30) Foreign Application Priority Data

Jan. 17, 2019 (JP) .............................. JP2019-006233

(51) Int. Cl.
*B60W 50/14* (2020.01)
*G07C 5/08* (2006.01)

(52) U.S. Cl.
CPC ........... *B60W 50/14* (2013.01); *G07C 5/0816* (2013.01); *B60W 2050/146* (2013.01)

(58) Field of Classification Search
CPC ............ B60W 50/14; B60W 2050/146; G07C 5/0816
See application file for complete search history.

(56) References Cited

U.S. PATENT DOCUMENTS

| 8,260,482 B1 | 9/2012 | Szybalski et al. |
| 9,964,950 B2 | 5/2018 | Takano |
| 10,017,116 B2 | 7/2018 | Sato |
| 10,310,508 B2 | 6/2019 | Kunisa et al. |
| 10,421,394 B2 | 9/2019 | Morimura et al. |
| 10,452,930 B2 | 10/2019 | Sato |
| 10,663,973 B2 | 5/2020 | Hashimoto et al. |
| 10,759,425 B2 | 9/2020 | Urano et al. |
| 10,895,875 B2 | 1/2021 | Hashimoto et al. |
| 11,001,198 B2 | 5/2021 | Morimura et al. |

(Continued)

FOREIGN PATENT DOCUMENTS

| DE | 10 2011 085 585 A1 | 5/2013 |
| DE | 10 2015 207 025 A1 | 10/2016 |

(Continued)

*Primary Examiner* — Michael D Lang
(74) *Attorney, Agent, or Firm* — Sughrue Mion, PLLC

(57) ABSTRACT

A driving assistance apparatus is configured to perform an assistance control of assisting in driving a vehicle, when a first condition and a second condition are satisfied, in a situation in which a target is recognized. The driving assistance apparatus is provided with: a determinator configured to determine a state of the assistance control. The determinator is configured (i) to determine that the state of the assistance control is a standby state if a standby condition is satisfied, wherein the standby condition requires that the first condition is satisfied, but the second condition is not satisfied, in the situation in which the target is recognized, and (ii) to determine that the state of the assistance control is an interruption state if an interruption condition is satisfied, wherein the interruption condition requires that the first condition is no longer satisfied while the satisfaction of the standby condition is continued.

8 Claims, 5 Drawing Sheets

(56) References Cited

U.S. PATENT DOCUMENTS

2015/0352956 A1 12/2015 Miuchi et al.
2017/0259821 A1* 9/2017 Nakadori .............. B60W 30/17

FOREIGN PATENT DOCUMENTS

| EP | 2 944 497 A1 | 11/2015 |
| JP | 2005-335561 A | 12/2005 |
| JP | 5930072 B2 | 6/2016 |
| JP | 2018-030479 A | 3/2018 |

* cited by examiner

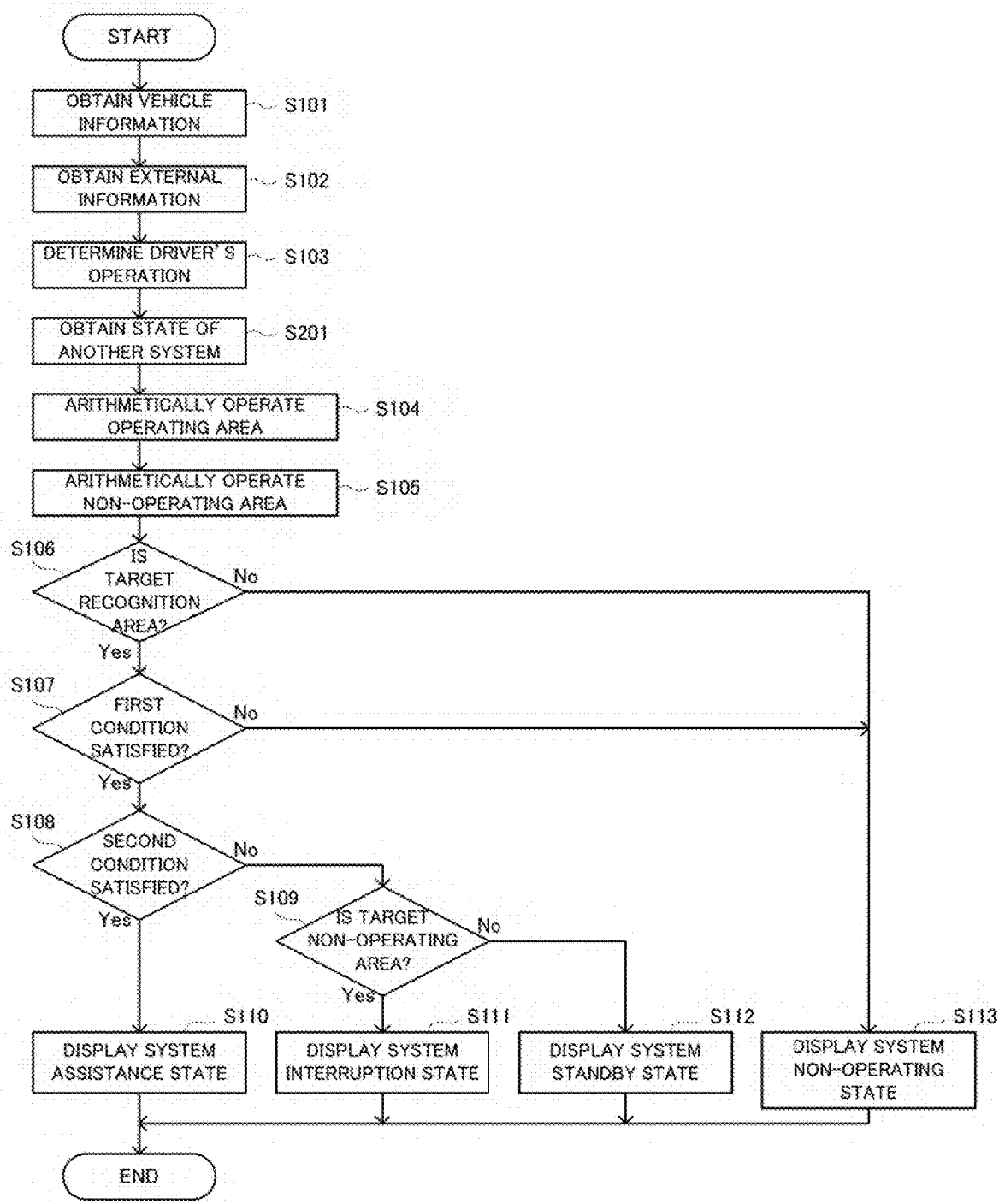

DRIVING ASSISTANCE APPARATUS

CROSS-REFERENCE TO RELATED APPLICATIONS

This application is based upon and claims the benefit of priority of the prior Japanese Patent Application No. 2019-006233, filed on Jan. 17, 2019, the entire contents of which are incorporated herein by reference.

BACKGROUND

1. Technical Field

Embodiments of the present disclosure relate to a driving assistance apparatus.

2. Description of the Related Art

For technologies/techniques used for this type of apparatus, for example, there is proposed a technology/technique of changing an image for displaying an assistance state, which is displayed to a driver, on the basis of an operating state of a driving assistance control (refer to Japanese Patent No. 5930072 (Patent Literature 1)).

A plurality of conditions may need to be satisfied in some cases to perform an assistance control of assisting in driving. In this case, because the plurality of conditions may need to be satisfied, the assistance control may or may not be performed even in the same situation. When the assistance control is not performed (in other words, when it is in a non-operating state), for example, if an image for displaying an assistance state indicating the non-operating state is uniformly displayed, then, a driver does not understand why the assistance control is not performed. This may cause the driver to feel anxiety, which is technically problematic. The technology/technique described in the Patent Literature 1 cannot solve the problem.

SUMMARY

In view of the problem described above, it is therefore an object of embodiments of the present disclosure to provide a driving assistance apparatus that can prevent a driver from feeling anxiety due to an aspect of informing the driver of a state of the assistance control.

A driving assistance apparatus according to an aspect of the present disclosure is a driving assistance apparatus configured to perform an assistance control of assisting in driving a vehicle, when a first condition associated with a matter other than an operation by a driver of the vehicle and a second condition associated with the operation by the driver are satisfied, in a situation in which a target is recognized, the driving assistance apparatus provided with: a determinator configured to determine a state of the assistance control; and an informer configured to inform the driver of the state of the assistance control, which is determined by the detemrinator, wherein the determinator is configured (i) to determine that the state of the assistance control is a standby state if a standby condition is satisfied, wherein the standby condition requires that the first condition is satisfied, but the second condition is not satisfied, in the situation in which the target is recognized, and (ii) to determine that the state of the assistance control is an interruption state if an interruption condition is satisfied, wherein the interruption condition requires that the first condition is no longer satisfied while the satisfaction of the standby condition is continued.

BRIEF DESCRIPTION OF THE DRAWINGS

FIG. 6 is a flowchart illustrating operations of the driving assistance apparatus according to the second embodiment.

DETAILED DESCRIPTION OF THE EMBODIMENTS

A driving assistance apparatus according to embodiments of the present disclosure will be explained with reference to the drawings.

First Embodiment

A driving assistance apparatus according to a first embodiment will be explained with reference to FIG. 1 to FIG. 4D.

(Configuration)

Figure 1:
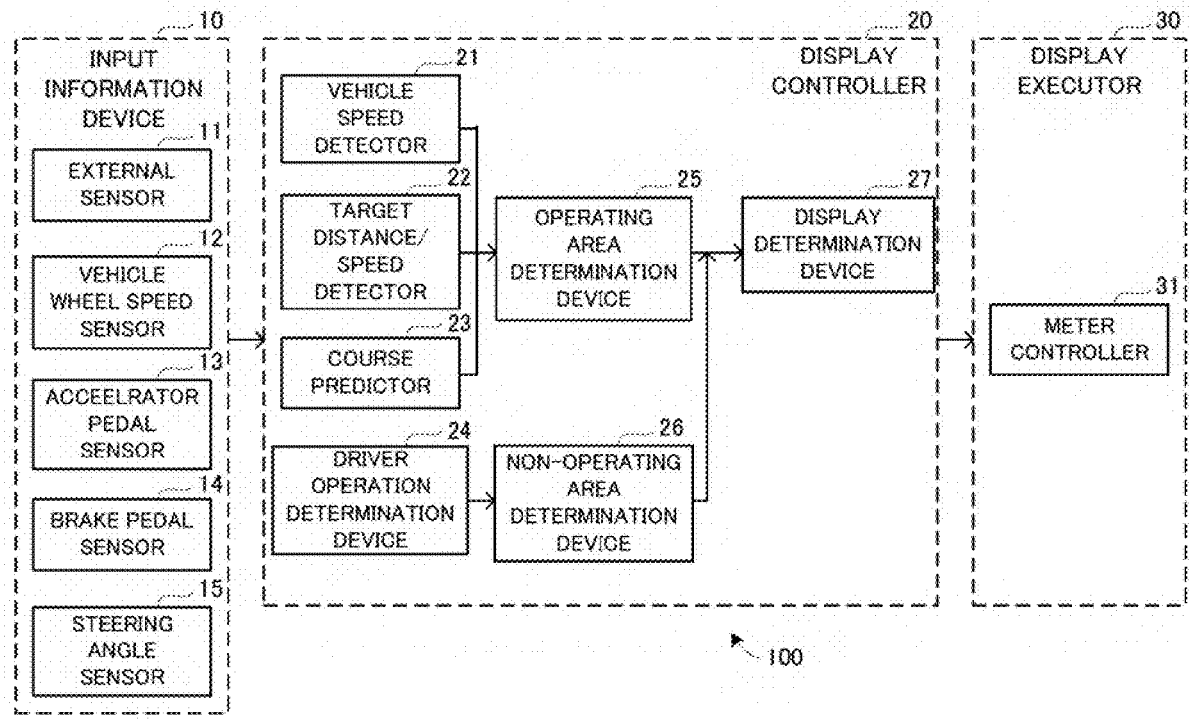
FIG. 1 is a block diagram illustrating a configuration of a driving assistance apparatus according to a first embodiment.

A configuration of the driving assistance apparatus according to the first embodiment will be explained with reference to FIG. 1. FIG. 1 is a block diagram illustrating the configuration of the driving assistance apparatus according to the first embodiment.

In FIG. 1, a driving assistance apparatus 100 is mounted on a vehicle 1. The driving assistance apparatus 100 is configured to perform an assistance control of assisting in driving the vehicle 1. The driving assistance apparatus 100 is configured to perform the assistance control, when a first condition associated with a matter other than an operation by a driver of the vehicle 1 (e.g., a speed of the vehicle 1, a distance from the vehicle 1 to a target, etc.) and a second condition associated with the driver's operation are satisfied, in a situation in which a target of the assistance control is recognized. In other words, the assistance control may be performed if the following three requirements are satisfied; namely, (i) the target is recognized, (ii) the first condition is satisfied, and (iii) the second condition is satisfied.

The target of the assistance control may be changed in accordance with contents of the assistance control. An example of the target may include: an obstacle, such as, for example, another vehicle, a pedestrian, and a structure; something that restricts travel of the vehicle 1, such as, for example, a road sign, a traffic light color, a white line, and a stop line; and a road structure, such as, for example, an intersection and a curve.

The first condition may be a condition associated with the speed of the vehicle 1, time to collision (TTC) for a preceding vehicle, which is another vehicle that travels ahead of the vehicle 1, a road structure such as, for example, a curve curvature and a road grade, a yaw rate of the vehicle 1, a state of a predetermined switch provided for the vehicle 1, a continuous operating time and an operating history associated with the assistance control, states of various actuators of the vehicle 1, a charge state of a battery of the vehicle 1, an ambient temperature, and the like.

More specifically, the first condition may be, for example, that the speed of the vehicle 1 is in a predetermined range, that the yaw rate of the vehicle 1 is less than a predetermined value, that the predetermined switch provided for the vehicle 1 is in an operating state, that the various actuators of the vehicle 1 are in an operable state, that the battery of the vehicle 1 is in a chargeable state, that the TTC for the target of the assistance control is less than a predetermined value, that a distance from the vehicle 1 to the target of the assistance control is less than a predetermined value, that the curve curvature is greater than a predetermined value, that the road grade is less than a predetermined value, the ambient temperature is in a predetermined range, and the like.

The second condition may be a condition associated with an operation amount of an accelerator pedal, an operation amount of a brake pedal, a gear shift operation, an operation amount of a steering wheel, and the like. More specifically, the second condition may be that the driver is not operating the accelerator pedal, that the driver is not operating the brake pedal, a gear shift is not in an M range (i.e., a manual operation state), that the gear shift is selecting a gear step that is greater than or equal to a predetermined step, that an angle of the steering wheel is less than or equal to a predetermined value, that a steering torque of the steering wheel is less than or equal to a predetermined value, that an operating speed of the steering wheel is less than or equal to a predetermined value, that a driver surveillance monitor detects a state in which the driver is not looking aside (or a state in which the driver is looking aside), and the like.

The driving assistance apparatus 100 particularly has a function of informing the driver of the vehicle 1, of a state of the assistance control. In the first embodiment, an explanation of specific contents of the assistance control will be omitted, and an explanation will be given to the function of information the driver of the state of the assistance control. The driving assistance apparatus 100 is provided with an input information device 10, a display controller 20, and a display executor 30, so as to inform the driver of the state of the assistance control.

The input information device 10 is provided with an external sensor 11, a vehicle wheel speed sensor 12, an accelerator pedal sensor 13, a brake pedal sensor 14, and a steering angle sensor 15. The external sensor 11 may include, for example, a millimeter wave radar, a camera, or the like. A detailed explanation of the vehicle wheel speed sensor 12, the accelerator pedal sensor 13, the brake pedal sensor 14, and the steering angle sensor 15 will be omitted because the existing technologies/techniques can be applied thereto.

The display controller 20 is provided with a vehicle speed detector 21, a target distance/speed detector 22, a course predictor 23, a driver operation determination device 24, an operating area determination device 25, a non-operating area determination device 26, and a display determination device 27.

The vehicle speed detector 21 is configured to detect the speed of the vehicle 1 on the basis of an output of the vehicle wheel speed sensor 12. The target distance/speed detector 22 is configured to detect a distance from the vehicle 1 to the target of the assistance control, and a relative speed between the vehicle 1 and the target, on the basis of an output of the external sensor 11. Here, if the target is a traffic light in red color (or a so-called "red light") or a stop sign, a distance from the vehicle 1 to a stop line corresponding to the red light or the stop sign may be set as the distance from the vehicle 1 to the target. Moreover, if the target is a curve or an intersection, a distance from the vehicle 1 to an entrance of a curve road or the intersection may be set as the distance from the vehicle 1 to the target.

The course predictor 23 is configured to predict a course of the vehicle 1, for example, on the basis of an output of the steering angle sensor 15 or the like. A detailed explanation of a method of predicting the course of the vehicle 1 will be omitted because the existing technologies/techniques can be applied thereto.

The driver operation determination device 24 is configured to determine whether or not there is the driver's operation and to detect an operation amount if there is the driver's operation, on the basis of respective outputs of the accelerator pedal 13, the brake pedal 14, and the steering angle sensor 15.

The operating area determination device 25 is configured to determine (or arithmetically operate) an operating area on the basis of respective outputs of the vehicle speed detector 21, the target distance/speed detector 22, and the course predictor 23. Specifically, the operating area determination device 25 may specify the target of the assistance control from the course of the vehicle 1, which is predicted by the course predictor 23. The operating area determination device 25 may determine (or arithmetically operate) the operating area, for example, on the basis of the speed of the vehicle 1, which is detected by the speed detector 21, the relative speed between the vehicle 1 and the specified target, which is detected by the target distance/speed detector 22, or the like.

Figure 2:
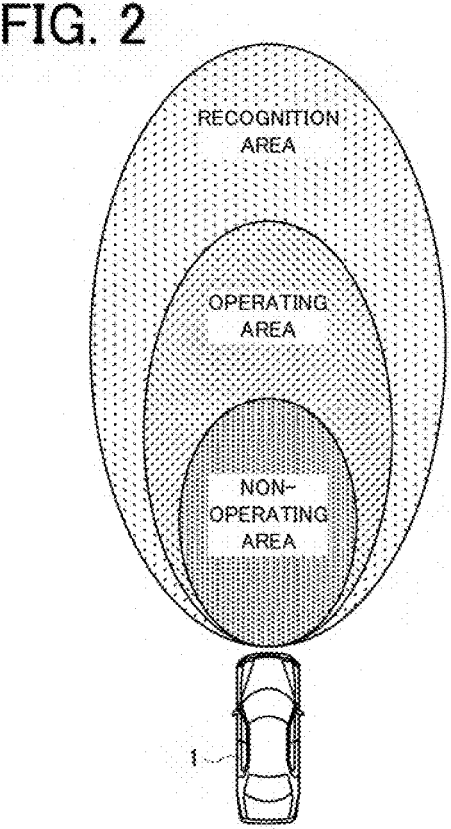
FIG. 2 is a diagram illustrating an example of an interrelation among a recognition area, an operating area, and a non-operating area.

Now, the operating area will be explained with reference to FIG. 2. In FIG. 2, a "recognition area" may be typically an area determined in accordance with a detection range of the external sensor 11, and may mean an area in which the target of the assistance control can be detected (or recognized) by the external sensor 11. A range of the "recognition area" may be changed in accordance with the contents of the assistance control. It can be said that the recognition area is an area in which at least the requirement "(i) the target is recognized" is satisfied from among the three requirements described above. Thus, the operating area is included in the recognition area.

Back in FIG. 1, the non-operating area determination device 26 is configured to determine (or arithmetically operate) a non-operating area (refer to FIG. 2) on the basis of an output of the driver operation determination device 24. Here, it takes some time from when the driver operates at least one of the accelerator pedal, the brake pedal, and the steering wheel, to when the state of the vehicle 1 becomes a state corresponding to the driver's operation. In other words, there is a response delay. The non-operating area determination device 26 may take into account the response delay and may determine (or arithmetically operate) an area as follows to be the "non-operating area"; namely, in the area, the first condition is currently satisfied, but the state of the vehicle 1 will change in the future due to the driver's current operation, and the first condition is presumably no longer satisfied. As illustrated in FIG. 2, the non-operating area may be typically included in the operating area. The non-operating area may not exist depending on the driver's operation.

The non-operating area determination device 26 may determine the operating area, for example, on the basis of a non-operating time or a non-operating distance of the assistance control caused by the driver's operation. Here, an example of the "non-operating time or the non-operating distance of the assistance control caused by the driver's operation" may include a predetermined distance indicating a time and a distance at which the assistance control is not operated after the brake pedal is released, a time and a distance at which the assistance control is not operated after the accelerator pedal is released, a time and a distance at which the assistance control is not operated after the operation amount of the steering wheel is less than or equal to a predetermined range, or the like. Alternatively, the non-operating area determination device 26 may determine the non-operating area, for example, on the basis of the speed of the vehicle 1, the yaw rate, a result of the course prediction, or the like, in addition to the non-operating time or the non-operating distance.

Alternatively, the non-operating area determination device 26 may determine the non-operating area, for example, on the basis of a delay time, which is a time between a time point at which a deceleration request is required by an electronic control unit (ECU) of the vehicle 1 and a time point at which the deceleration request is realized on the vehicle 1, if the assistance control is a deceleration assistance control. Here, an example of the "delay time" may include a delay time of a communication, a response time of an actuator, or the like. Alternatively, the non-operating area determination device 26 may determine the non-operating area, for example, on the basis of the speed of the vehicle 1, the yaw rate, the result of the course prediction, or the like, in addition to the delay time.

The display determination device 27 is configured to determine the state of the assistance control, for example, on the basis of the operating area determined by the operating area determination device 25, the non-operating area determined by the non-operating area determination device 26, the speed of the vehicle 1 detected by the vehicle detector 21, the distance from the vehicle 1 to the target and the relative speed between the vehicle 1 and the target, which are detected by the target distance/speed detector 22, or the like.

Now, the state of the assistance control according to the first embodiment will be explained. In the first embodiment, the state of the assistance control is referred to as an "operating state" if the assistance control is performed. The state of the assistance control is referred to as a "non-operating state" if at least the requirement "(i) the target is recognized" is not satisfied from among the three requirements described above, or if the requirement "(i) the target is recognized" is satisfied from among the three requirements described above, but at least the requirement "(ii) the first condition is satisfied" is not satisfied from among the remaining two requirement, i.e., if at least one of the requirement "(i) the target is recognized" and the requirement "(ii) the first condition is satisfied" is not satisfied from among the three requirements described above.

The state of the assistance control is referred to as a "standby state", basically, if the requirement "(i) the target is recognized" and the requirement "(ii) the first condition is satisfied" are satisfied from among the three requirements described above, but the requirement "(iii) the second condition is satisfied" is not satisfied. In the standby state, the assistance control is performed as long as the driver performs an operation such that the second condition is satisfied. In the operating area described above (refer to FIG. 2), the requirement "(i) the target is recognized" and the requirement "(ii) the first condition is satisfied" are satisfied. Thus, the assistance control is performed if the requirement "(iii) the second condition is satisfied" is satisfied, and the assistance control is in the "standby state" if the requirement "(iii) the second condition is satisfied" is not satisfied.

The state of the assistance control is referred to as an "interruption state" if such a requirement that the target of the assistance control is in the non-operating area is satisfied (in this case, typically, the requirement "(ii) the first condition is satisfied" is no longer satisfied) when it is in the standby state (i.e., when it is in a state in which the requirement "(i) the target is recognized" and the requirement "(ii) the first condition is satisfied" are satisfied, but the requirement "(iii)" the second condition is satisfied" is not satisfied). In the interruption state, the requirement "(ii) the first condition is satisfied" is not satisfied. Thus, the assistance control is not performed even if the driver performs an operation such that the second condition is satisfied.

In any of the "non-operating state", the "standby state", and the "interruption state", the assistance control is not performed because at least one of the three requirements described above is not satisfied. In the first embodiment, when the assistance control is not performed, the state of the assistance control is classified into the "non-operating state", the "standby state", and the "interruption state".

The display executor 30 is configured to inform the driver of the state of the assistance control determined by the display determination device 27. Specifically, for example, a meter controller 31 of the display executor 30 may inform the driver of the state of the assistance control determined by the display determination device 27, by turning on, blinking on and off, or turning off a predetermined indicator in an instrument panel of the vehicle 1, or by changing a lighting color. Alternatively, the meter controller 21 may inform the driver of the state of the assistance control determined by the display determination device 27, by displaying an image indicating the state of the assistance control on a display in the instrument panel of the vehicle 1. The display executor 30 may inform the driver of the state of the assistance control determined by the display determination device 27, by using audio information, in addition to or instead of visual information.

(Operations)

Figure 3:
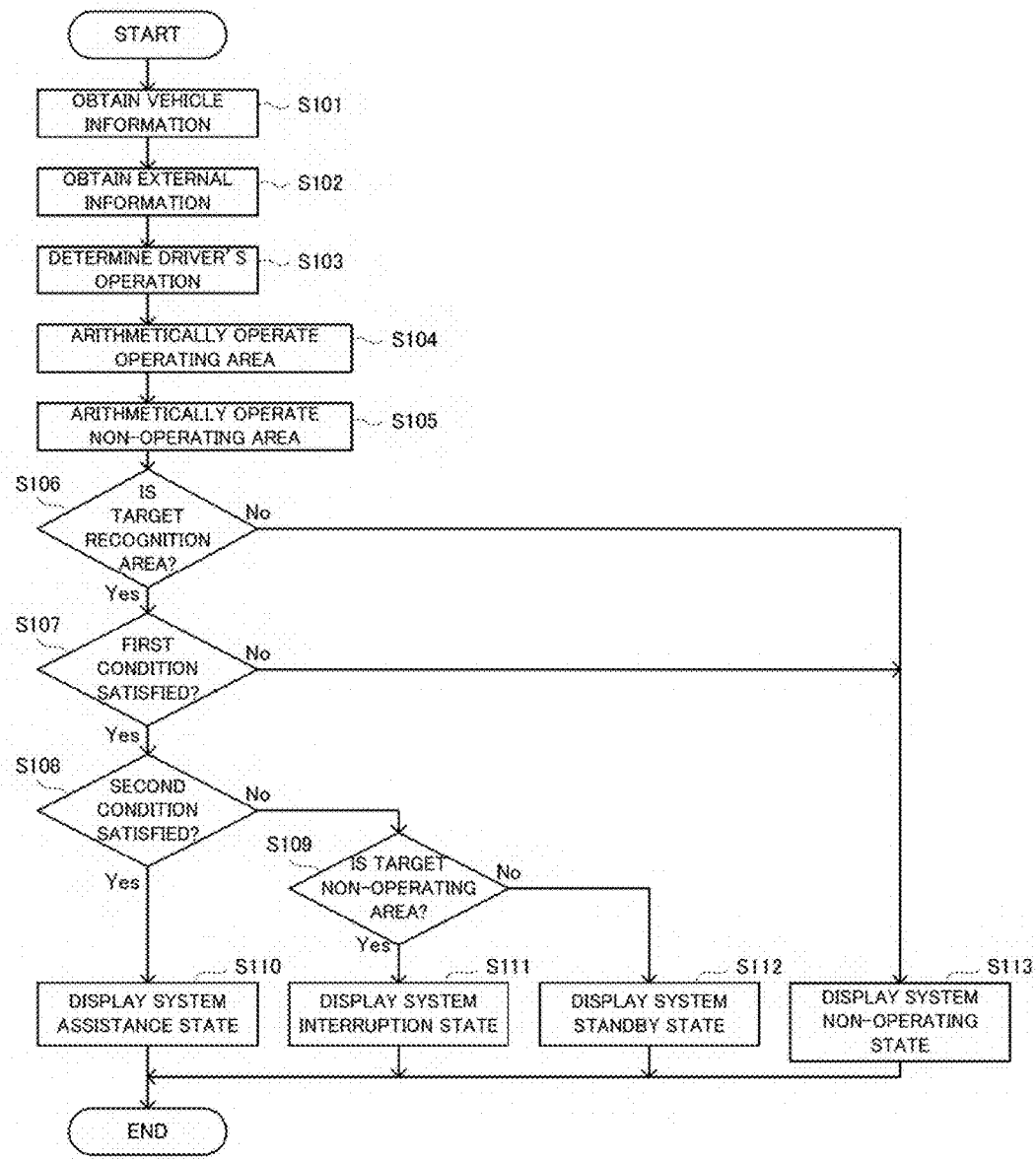
FIG. 3 is a flowchart illustrating operations of the driving assistance apparatus according to the first embodiment.

Operations of the driving assistance apparatus 100 will be explained with reference to a flowchart in FIG. 3. In FIG. 3, the display controller 20 obtains vehicle information associated with the vehicle 1, on the basis of respective outputs of the vehicle wheel speed sensor 12, the accelerator pedal 13, the brake pedal 14, and the steering angle sensor 15 (step S101). Moreover, the display controller 20 obtains external information on the basis of the output of the external sensor 11 (step S102).

The driver operation determination device 24 determines whether or not there is the driver's operation and detects the operation amount when there is the driver's operation, on the basis of respective outputs of the accelerator pedal 13, the brake pedal 14, and the steering angle sensor 15 (step S103).

The operating area determination device 25 determines (or arithmetically operates) the operating area on the basis of respective outputs of the vehicle speed detector 21, the target distance/speed detector 22, and the course predictor 23 (step S104). The non-operating area determination device 26 determines (or arithmetically operates) the non-operating area (refer to FIG. 2) on the basis of the output of the driver operation determination device 24 (step S105).

Figure 4A:
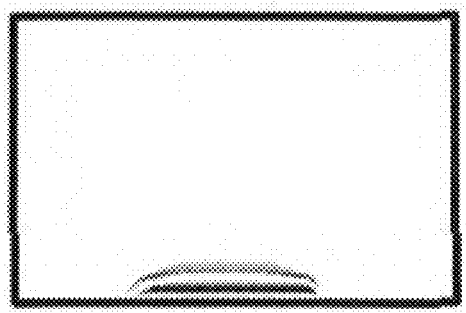
FIG. 4A is a diagram illustrating an example of an image indicating a state.

The display determination device 27 of the display controller 20 determines whether or not the target of the assistance control is in the recognition area (step S106). In the step S106, if it is determined that the target of the assistance control is not in the recognition area (the step S106: No), the display determination device 27 determines that the state of the assistance control is the "non-operating state". It is because all the three requirements described above are not satisfied. As a result, an image indicating the "non-operating state" is displayed, for example, as illustrated in FIG. 4A, by the meter controller 31 of the display executor 30 (step S113).

In the step S106, if it is determined that the target of the assistance control is in the recognition area (the step S106: Yes), the display determination device 27 determines whether or not the first condition (i.e., the first condition associated with the matter other than the driver's operation) is satisfied (step S107). In the step S107, if it is determined that the first condition is not satisfied (the step S107: No), the display determination device 27 determines that the state of the assistance control is the "non-operating state". It is because, in this case, the target of the assistance control is highly likely outside the operating area (refer to FIG. 2). As a result, the image indicating the "non-operating state" is displayed by the meter controller 31 of the display executor 30 (the step S113).

Figure 4B:
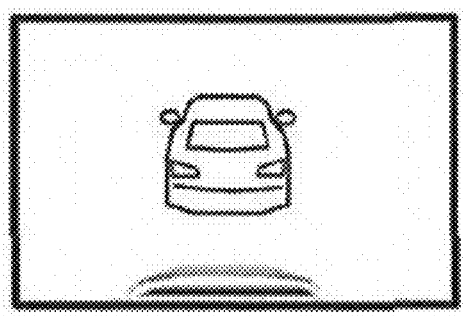
FIG. 4B is a diagram illustrating an example of an image indicating a state.
Figure 4C:
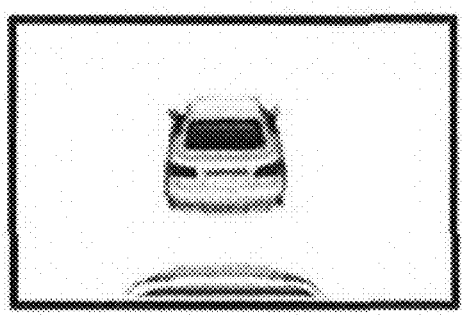
FIG. 4C is a diagram illustrating an example of an image indicating a state.
Figure 4D:
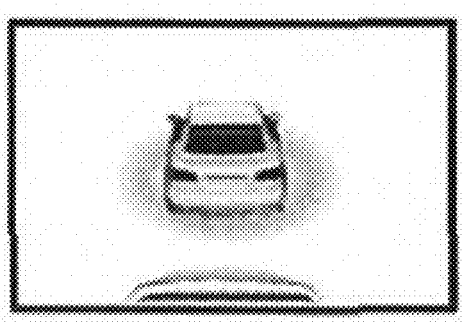
FIG. 4D is a diagram illustrating an example of an image indicating a state.

In the step S107, if it is determined that the first condition is satisfied (the step S107: Yes), the display determination device 27 determines whether or not the second condition is satisfied (step S108). In the step S108, if it is determined that the second condition is satisfied (the step S108: Yes), the display determination device 27 determines that the state of the assistance control is the "operating state". It is because the following three requirements are satisfied; namely, (i) the target is recognized, (ii) the first condition is satisfied, and (iii) the second condition is satisfied. As a result, an image indicating the "operating state (i.e., the assistance state in which the assistance control is performed)" is displayed, for example, as illustrated in FIG. 4D, by the meter controller 31 of the display executor 30 (step S110).

In the step S108, if it is determined that the second condition is not satisfied (the step S108: No), the state of the assistance control is basically the standby state. Exceptionally, however, if the target of the assistance control is in the non-operating area (refer to FIG. 2), the state of the assistance control is the interruption state. Thus, the display determination device 27 determines whether or not the target of the assistance control is in the non-operating area, in a situation in which the state of the assistance control continues to be the standby state (i.e., the state in which the requirement "(i) the target is recognized" and the requirement "(ii) the first condition is satisfied" are satisfied, but the requirement "(iii) the second condition is satisfied" is not satisfied) (step S109). In the step S109, if it is determined that the target of the assistance control is in the non-operating area (the step S109: Yes), the display determination device 27 determines that the state of the assistance control is the "interruption state". As a result, an image indicating the "interruption state" is displayed, for example, as illustrated in FIG. 4B, by the meter controller 31 of the display executor 30 (step S111).

In the step S109, if it is determined that the target of the assistance control is not in the non-operating area (the step S109: No), the display determination device 27 determines that the state of the assistance control is the "standby state". It is because it is in the state in which the requirement "(i) the target is recognized" and the requirement "(ii) the first condition is satisfied" are satisfied, but the requirement "(iii) the second condition is satisfied" is not satisfied. As a result, an image indicating the "interruption state" is displayed, for example, as illustrated in FIG. 4C, by the meter controller 31 of the display executor 30 (step S112).

The images illustrated in FIG. 4A to FIG. 4D are merely examples, and how to inform the driver of the state of the assistance control is not limited to these examples. As described above, the driver may be informed of the state of the assistance control, by turning on, blinking on and off, or turning off the predetermined indicator, or by changing the lighting color. The driver may be also informed of the state of the assistance control, by using not only image information but also character information and audio information.

(Technical Effect)

A plurality of conditions may need to be satisfied in some cases to perform the assistance control of assisting in driving. In this case, because the plurality of conditions may need to be satisfied, the assistance control may or may not be performed even in the same situation.

On the driving assistance apparatus 100, the driver may be informed of any of the "non-operating state", the "standby state", and the "interruption state", depending on whether or not each of the three requirements for the assistance control to be performed (i.e., (i) the target is recognized, (ii) the first condition is satisfied, and (iii) the second condition is satisfied) is satisfied, even if the assistance control is not performed.

Thus, the driver of the vehicle 1 on which the driving assistance apparatus 100 is mounted can easily know the state of the assistance control, for example, in comparison with an apparatus on which the image indicating the non-operating state is uniformly displayed, when the assistance control is not performed. Particularly, if the "standby state" transitions to the "interruption state", the driver of the vehicle 1 can recognize that the assistance by the assistance control cannot be received, and thus can prepare himself or herself to drive. Therefore, according to the driving assistance apparatus 100, it is possible to prevent the driver from feeling anxiety due to an aspect of informing the driver of the state of the assistance control.

By the way, if the target of the assistance control is an object whose position is fixed, such as, for example, a road sign, then, as the vehicle 1 travels toward the target, the position of the target transitions in one direction in order of the recognition area, the operating area, and the non-operating area (refer to FIG. 2). Thus, a situation in which the requirement "(ii) the first condition is satisfied" is not satisfied after the standby state, is limited to when the target of the assistance control is in the non-operating area.

On the other hand, if the target of the assistance control is a moving body, such as, for example, another vehicle, even if the vehicle 1 travels toward the target, the position of the target possibly transitions from the operating area to the recognition area (i.e., the target possibly goes way from the vehicle 1) depending on a relative speed between the vehicle 1 and the target. If the target of the assistance control is in the recognition area, it is in the "non-operating state", but even in this case, it can be also interpreted to be the "interruption state" in which the requirement "(ii) the first condition is satisfied" is no longer satisfied when it is in the standby state. On the driving assistance apparatus 100, the driver is informed of the "interruption state" only if it is determined that the target of the assistance control is in the non-operating area, in the step S109 described above. By virtue of such a configuration, it is possible to prevent the driving assistance apparatus 100 from erroneously recognizing that it is in the "interruption state".

Second Embodiment

A driving assistance apparatus according to a second embodiment will be explained with reference to FIG. 5 and FIG. 6. The second embodiment is partially different in the configuration of the apparatus, but is the same as the first embodiment described above. Thus, in the second embodiment, the same explanation as those in the first embodiment will be omitted. The same positions on the drawings will carry the same reference numerals and basically different points will be explained with reference to FIG. 5 and FIG. 6.

(Configuration)

Figure 5:
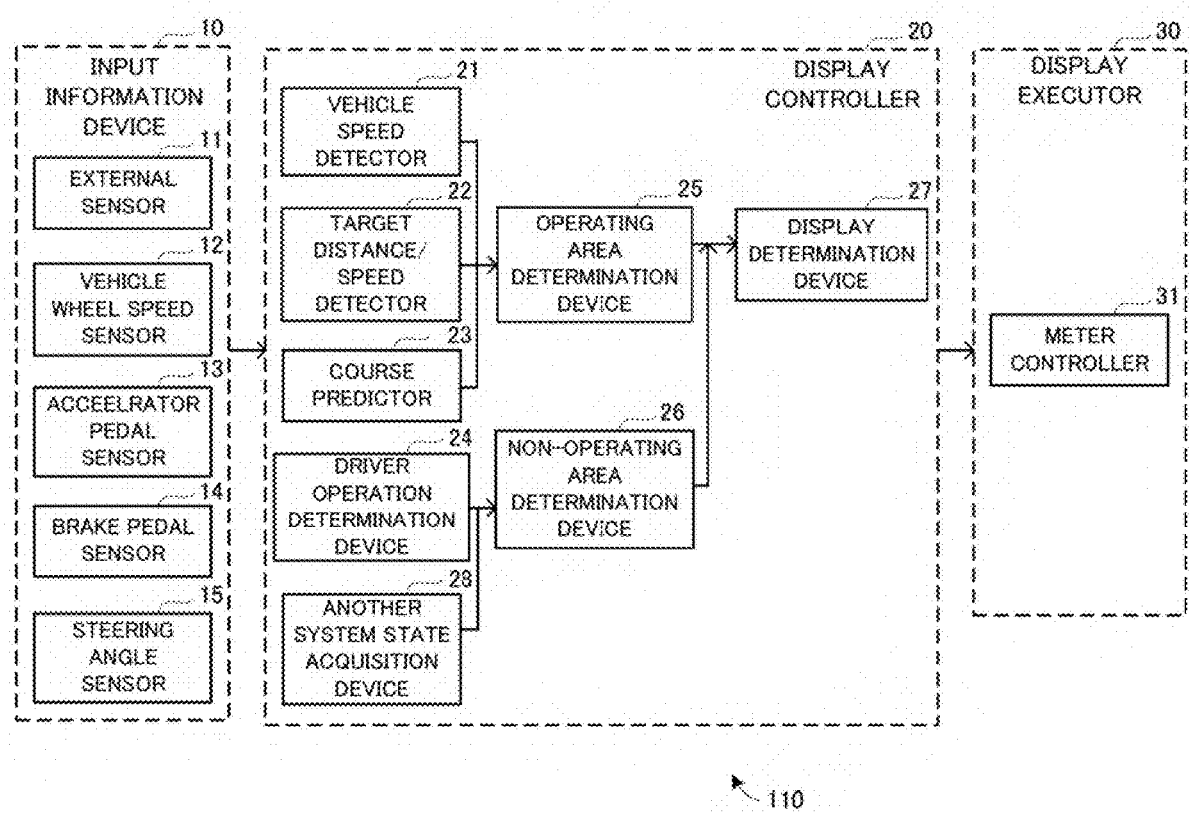
FIG. 5 is a block diagram illustrating a configuration of a driving assistance apparatus according to a second embodiment.

In FIG. 5, the display controller 20 of a driving assistance apparatus 110 is provided with an another system state acquisition device 28. The another system state acquisition device 28 is configured to obtain an operating state of another system that performs another control, which is different from the assistance control performed by the driving assistance apparatus 110. The driving assistance apparatus 110 is configured not to perform the assistance control if another control that competes with the assistance control is performed by another system, i.e., if another control is operated. In other words, on the driving assistance apparatus 110, the first condition described above may include a requirement associated with the operating state of another control (hereinafter referred to as an "another control requirement" as occasion demands.

The non-operating area determination device 26 is configured to determine (or arithmetically operate) the non-operating area (refer to FIG. 2) on the basis of the operating state of another system obtained by the another system state acquisition device 28, in addition to the output of the driver operation determination device 24. Specifically, the non-operating area determination device 26 may estimate a period from the start to the end of another control, if the requirement "(ii) the first condition is satisfied" is no longer satisfied due to the start of another control that competes with the assistance control, when it is in the standby state (i.e., when it is in the state in which the requirement "(i) the target is recognized" and the requirement "(ii) the first condition is satisfied" are satisfied, but the requirement "(iii)" the second condition is satisfied" is not satisfied), and may determine (or arithmetically operate) the non-operating area on the basis of a distance moved by the vehicle 1 in the estimated period.

The non-operating area determination device 26 may determine the non-operating area, for example, on the basis of a predicted operating time in which another control that cannot simultaneously operate with (i.e. that completes with) the assistance control is in operation. Here, the "predicted operating time" may be obtained, for example, from an operating state of an antilock brake system (ABS) as another control if the assistance control is a deceleration assistance control, an operating time of the ABS predicted from recognition information about a road surface, a slip ratio of vehicle wheels or vehicle body acceleration during the operation of the ABS, a curve curvature ahead of the vehicle 1 or an operating time predicted from the yaw rate of the vehicle 1 when vehicle stability control (VSC) as another control is operated, or the like. Alternatively, the non-operating area determination device 26 may determine the non-operating area, for example, on the basis of the speed of the vehicle 1, the yaw rate, the result of the course prediction, or the like, in addition to the predicted operating time described above. The non-operating area may be determined on the basis of a "predicted operating distance" instead of the "predicted operating time" described above.

In the second embodiment, in some cases, there may be the non-operating area that is determined on the basis of the output of the driver operation determination device 24 and the non-operating area that is determined on the basis of the operating state of another system obtained by the another system state acquisition device 28.

(Operations)

Operations of the driving assistance apparatus 110 will be explained with reference to a flowchart in FIG. 6. In FIG. 6, the another system state acquisition device 28 obtains the operating state of another system (step S201), in parallel with the step S101 to the step S103 described above.

In the step S107, if the another control requirement included in the first condition is not satisfied, it is determined that the first condition is not satisfied. On the other hand, when the another control requirement is satisfied, if the other requirements included in the first condition are satisfied, it is determined that the first condition is satisfied.

In the step S109, if there is the target of the assistance control in at least one of the non-operating area that is determined on the basis of the output of the driver operation determination device 24 and the non-operating area that is determined on the basis of the operating state of another system, it is determined that the target of the assistance control is in the non-operating area.

Various aspects of embodiments of the present disclosure derived from the embodiments explained above will be explained hereinafter.

A driving assistance apparatus according to an aspect of embodiments of the present disclosure is a driving assistance apparatus configured to perform an assistance control of assisting in driving a vehicle, when a first condition associated with a matter other than an operation by a driver of the vehicle and a second condition associated with the operation by the driver are satisfied, in a situation in which a target is recognized, the driving assistance apparatus provided with: a determinator configured to determine a state of the assistance control; and an informer configured to inform the driver of the state of the assistance control, which is determined by the detemrinator, wherein the determinator is configured (i) to determine that the state of the assistance control is a standby state if a standby condition is satisfied, wherein the standby condition requires that the first condition is satisfied, but the second condition is not satisfied, in the situation in which the target is recognized, and (ii) to determine that the state of the assistance control is an interruption state if an interruption condition is satisfied, wherein the interruption condition requires that the first condition is no longer satisfied while the satisfaction of the standby condition is continued. In the embodiments described above, the display controller 20 corresponds to an example of the determinator, and the display executor 30 corresponds to an example of the informer.

On the driving assistance apparatus, it is possible to inform the driver of the state of the assistance control in detail, in comparison with an apparatus according to a comparative example, which is configured to inform the driver only of an operating state in which the assistance control is performed and a non-operating state in which the assistance control is not performed. Therefore, according to the driving assistance apparatus, it is possible to prevent the driver from feeling anxiety due to an aspect of informing the driver of the state of the assistance control.

In an aspect of the driving assistance apparatus, the first condition includes another control requirement associated with an operating state of another control that is different from the assistance control. According to this aspect, even if the assistance control associated with the driving assistance apparatus is not performed due to another control, for example, the driver is informed that it is in the interruption state.

In another aspect of the driving assistance apparatus, the determinator is configured to set a first area in which the interruption condition is predicted to be satisfied due to the operation by the driver, and to allow the informer to inform the driver that the state of the assistance control is the interruption state, if the interruption condition is satisfied and if the target is located in the first area.

In another aspect of the driving assistance apparatus, the determinator is configured to allow the informer to inform the driver that the state of the assistance control is the interruption state, if the interruption condition is satisfied and if the target is located in a second area, which is set ahead of the vehicle in a course thereof in accordance with a moving distance of the vehicle in a predetermined period from a time point at which the interruption condition is satisfied.

According to these aspects, it is possible to limit the areas in which the driver is informed that it is in the interruption state. The "non-operating area" in the embodiments described above corresponds to an example of the "first area" and the "second area".

The "predetermined period" may be set as a period in which the satisfaction of the interruption condition is presumably continued after the interruption condition is satisfied. The "predetermined period" may be changed, as occasion demands, depending on a cause of the satisfaction of the interruption condition.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus configured to perform an assistance control of assisting in driving a vehicle, when a first condition associated with a matter other than an operation by a driver of the vehicle and a second condition associated with the operation by the driver are satisfied, in a situation in which a target is recognized, said driving assistance apparatus comprising:
    a determinator configured to determine a state of the assistance control; and
    an informer configured to inform the driver of the state of the assistance control, which is determined by said detemrinator, wherein
    said determinator is configured (i) to determine that the state of the assistance control is a standby state if a standby condition is satisfied, wherein the standby condition requires that the first condition is satisfied, but the second condition is not satisfied, in the situation in which the target is recognized, and (ii) to determine that the state of the assistance control is an interruption state if an interruption condition is satisfied, wherein the interruption condition requires that the first condition is no longer satisfied while the satisfaction of the standby condition is continued.

2. The driving assistance apparatus according to claim 1, wherein the first condition includes another control requirement associated with an operating state of another control that is different from the assistance control.

3. The driving assistance apparatus according to claim 2, wherein said determinator is configured
    to set a first area in which the interruption condition is predicted to be satisfied due to the operation by the driver, and
    to allow said informer to inform the driver that the state of the assistance control is the interruption state, if the interruption condition is satisfied and if the target is located in the first area.

4. The driving assistance apparatus according to claim 3, wherein said determinator is configured to allow said informer to inform the driver that the state of the assistance control is the interruption state, if the interruption condition is satisfied and if the target is located in a second area, which is set ahead of the vehicle in a course thereof in accordance with a moving distance of the vehicle in a predetermined period from a time point at which the interruption condition is satisfied.

5. The driving assistance apparatus according to claim 2, wherein said determinator is configured to allow said informer to inform the driver that the state of the assistance control is the interruption state, if the interruption condition is satisfied and if the target is located in a second area, which is set ahead of the vehicle in a course thereof in accordance with a moving distance of the vehicle in a predetermined period from a time point at which the interruption condition is satisfied.

6. The driving assistance apparatus according to claim 1, wherein said determinator is configured
    to set a first area in which the interruption condition is predicted to be satisfied due to the operation by the driver, and
    to allow said informer to inform the driver that the state of the assistance control is the interruption state, if the interruption condition is satisfied and if the target is located in the first area.

7. The driving assistance apparatus according to claim 6, wherein said determinator is configured to allow said informer to inform the driver that the state of the assistance control is the interruption state, if the interruption condition is satisfied and if the target is located in a second area, which is set ahead of the vehicle in a course thereof in accordance with a moving distance of the vehicle in a predetermined period from a time point at which the interruption condition is satisfied.

8. The driving assistance apparatus according to claim 1, wherein said determinator is configured to allow said informer to inform the driver that the state of the assistance control is the interruption state, if the interruption condition is satisfied and if the target is located in a second area, which is set ahead of the vehicle in a course thereof in accordance with a moving distance of the vehicle in a predetermined period from a time point at which the interruption condition is satisfied.

* * * * *